S. R. THOMPSON.
Machines for Preparing Pottery Stock.

No. 138,824.    Patented May 13, 1873.

Witnesses
Saml. M. Barton
Jesse B. Fowler

Inventor
Saml. R. Thompson
by his atty
Carroll D. Wright

UNITED STATES PATENT OFFICE.

SAMUEL R. THOMPSON, OF PORTSMOUTH, NEW HAMPSHIRE.

IMPROVEMENT IN MACHINES FOR PREPARING POTTERY-STOCK.

Specification forming part of Letters Patent No. 138,824, dated May 13, 1873; application filed February 8, 1873.

*To all whom it may concern:*

Figure 1:
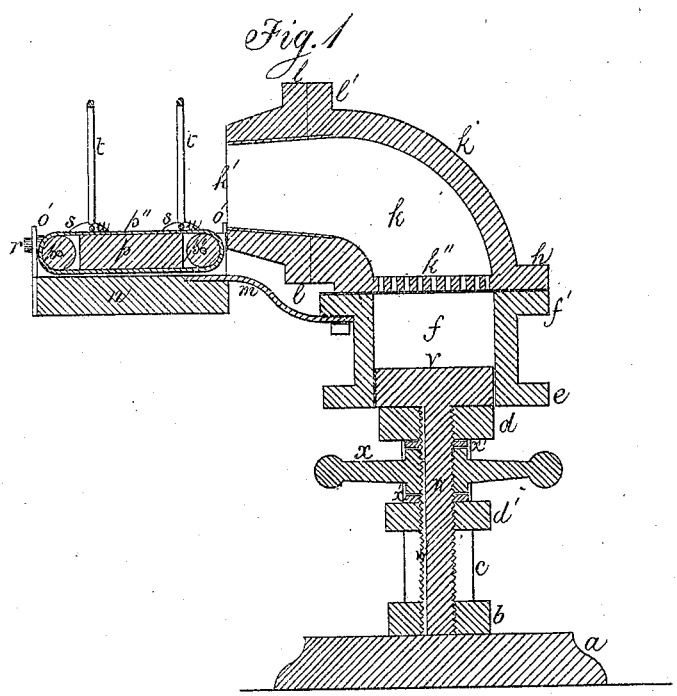
Figure 2:
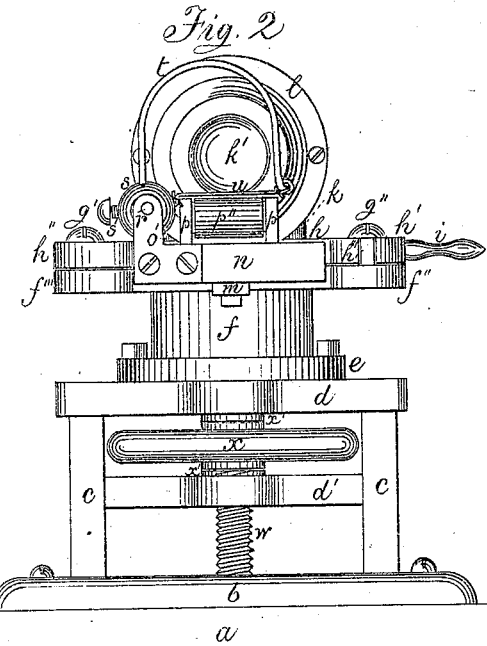

Be it known that I, SAMUEL R. THOMPSON, of Portsmouth, in the county of Rockingham and State of New Hampshire, have invented certain Improvements in Machines for Preparing Pottery-Stock, of which the following is a specification:

Figure 1 of the accompanying drawing is a central vertical longitudinal section, and Fig. 2 is a front view of my improved machine for preparing pottery-stock, &c.

The present invention relates to certain new and useful improvements in machines for preparing the clay or stock for pottery, &c.; and has for its principal objects the screening, clearing of air, and balling or rolling the clay, &c., in an effective and expeditious manner by one apparatus, thereby saving the time, labor, and expense hitherto expended in preparing the stock by the ordinary methods. My improvements consist, mainly, in an apparatus arranged and operating, as will be hereinafter more fully explained, so that clay or pottery-stock, &c., after being ground, being deposited in a cylinder, is forced by a plunger, operated by a screw-stem, through a screen formed in or connected with the bottom of a tapering curved tube, up through and out of the narrow mouth of said tube upon an endless feed-roller, by which it is carried along in a continuous solid roll, and, by the operation of adjustable cutters, cut off in the exact sizes required for use, the clay or stock, &c., being by the above process freed from stones, &c., and air-bubbles or blisters, and fully prepared for pottery use, without the time and trouble heretofore expended in screening the clay, relieving it of air-bubbles, &c., and in weighing the prepared clay to obtain the proper amount required for use. My improvements also consist in arranging and operating, as will be duly explained, the upper portion of the apparatus, so as to give ready access to the receiving-cylinder, and allow the clay or stock to be admitted as the plunger is descending, thus saving time and labor in feeding the machine.

In the accompanying drawing, $a$ represents a platform, to which is attached the bottom bar or plate $b$ of a frame consisting of two uprights, $c$, connected by a top bar or plate, $d$, and a central bar or plate, $d'$. Attached to the top plate or bar $d$ is a circular plate, $e$, extending beyond and forming the bottom of a receiving-cylinder, $f$, formed on the top with a circular flange, $f'$, that extends on each side so as to form ears $f''\ f'''$ provided with screws or stems $g'\ g''$. Turning on the screw $g'$, and over the flanged top of the receiving-cylinder $f$ is an adjustable circular plate, $h$, with extended side ears $h'\ h''$, similar to the ears $f''\ f'''$. The ear $h'$ is formed with a slot or notch, $h'''$, that receives, when the plate $h$ is closed, the screw or stem $g''$, whose top holds the plate $h'$ down in position, or allows of its being turned to one side, a handle, $i$, being attached to one end of the ear $h'$ to facilitate the horizontal movement of the plate $h$. Extending upward from the plate $h$, which forms its bottom, is a curved tube, $k$, gradually diminishing in the interior from the base toward its mouth $k'$, which is formed on the exterior, of a tapering shape, enlarging toward the rear, where it is formed with a flange or collar, $l$, that is attached by screws or otherwise to a corresponding collar, $l'$, formed on the tube $k$. The bottom of the tube $k$ is formed or supplied with a perforated disk or screen, $k''$, that, when the plate $h$ is closed, fits over the top of the opening of the receiving-cylinder $f$. Attached to the flange $f'$, or otherwise connected with the apparatus by a curved plate, $m$, or other suitable device, is a platform, $n$, that extends horizontally in front of the mouth $k'$ of the tube $k$, and supports a frame, $p$, provided with transverse rollers $p'$, over which passes an endless chain or roll, $p''$, on a level with the bottom of the opening of the mouth $k'$ of the tube $k$. To the front and rear of the platform $n$, at one side, are attached standards $o'$, in which turn the ends of a shaft or rod, $r$, on which are adjustable balls or hinges, $s$, each provided with a screw, $s'$, that turns in the ball so as to impinge against or be released from the shaft $r$ and hold or allow the longitudinal movement of the ball on it. Attached to each of the balls $s$, and extending upward, over, and downward, is an arched rod, $t$, to the bottom of one end of which is connected one end of a wire or cutter, $u$, the other end of which wire is attached to the ball $s$. Within the receiving-cylinder $f$ is a circular plate or plunger, $v$, arranged to work up and down by means of a vertical screw-stem, $w$, to the top of which the plunger is attached, and which is supported in bearings formed by the bars $d\ d'$, and is formed with a vertical groove, $w'$, in which engages a dog, to prevent the rotation of the stem, and is operated up and down by the rotation of a wheel, $x$, provided with proper washers $x'$ between the ends of the wheel-hub and the bars $d$ $d'$; or any other device or arrangement of devices that may be preferred may be used for operating the plunger $v$ up and down in the receiving-cylinder $f$. By nesting or the insertion of tubes of different dimensions within the mouth $k'$ of the tube $k$ any diameter desired may be given to the roll of clay or stock as it issues from the tube.

The operation of my invention is as follows: The plunger $v$ being at the bottom of the receiving-cylinder, which is thus prepared to receive the ground clay or stock, the plate $h$ being turned on its fulcrum $g'$ to one side for its admission, and then, when filled, turned over the cylinder $f$, where it is held by the head of the screw $g''$, the stem of which receives the notch or slot $h'''$, when the cylinder $f$ is filled the wheel $x$ is turned, thereby elevating the screw-shaft $w$, and consequently the plunger $v$ connected with it, and thereby pressing the clay up through the apertures of the screen $k''$, thus relieving it of any stones, &c., into the tube $k$. When the plunger $v$ has reached the top of the cylinder $f$, and is emptied, it is lowered by the reverse revolution of the wheel $x$, which lowers the screw-stem $w$, and the plate $h$ is again turned to one side and the cylinder $f$ opened, and, as the plunger $v$ descends, the stock is introduced, the plate $h$ closed, and the wheel $x$ again operated, thus forcing more stock through the screen $k''$ and into the tube $k$, and propelling the stock forward through the tube, which, being contracted toward its mouth, tightly compresses the clay or stock in its passage, and relieves it of any air-bubbles or blisters, &c., and presses it out at the mouth $k'$ of the tube in a firmly-compressed roll of the desired diameter that is deposited upon and fed along by the feed-roll $p''$ in a continuous length, and then cut off in the desired lengths by the wires or cutters $u$, which are adjusted to the proper widths and brought down upon it by the action of the arched rods $t$, which are adjusted to the width desired for the amount of stock to be used by means of the balls $s$ arranged to slide longitudinally, and, by means of the screws $s'$, held in any desired position on the shaft $r$, and which are raised and lowered by the turning of the shaft $r$ in the bearings $o'$.

In preparing clay, &c., for pottery much difficulty is occasioned by the formation of air-bubbles or blisters, to remove which it has heretofore been necessary to work over by hand the stock after it has been screened and otherwise prepared, and when the whole preparatory operation has been performed the stock is then weighed to ascertain the exact amount required for use. Moreover, in screening the stock, the receptacle in which it is contained has heretofore been obliged to be lifted and tipped over and emptied before any new stock could be introduced.

In my improvements it will readily be seen, by the foregoing description, reference being had to the accompanying drawing, that the above objections are obviated by forcing the stock through the perforated bottom of the tube, which frees it from any pebbles, &c., and then pressing it up through the gradually-tapering tube, where the clay particles are firmly pressed together in a solid roll in such a manner as to remove all air-bubbles or blisters, and then issuing from the narrow mouth of the tube in the proper size and fed along on the endless feed-roller, where, by the action of the cutters, it is cut off in the required lengths ready for use, thus obviating the necessity of weighing, and saving the time, labor, and expense heretofore expended.

By the arrangement of the adjustable upper portion of the apparatus it will be seen that, by merely shoving the plate $h$ to one side, easy access is had to the receiving-cylinder $f$, which may be filled as the plunger is descending, thereby saving time and labor in the operation.

Having thus fully described my improvements, what I claim as my invention, and desire to have secured to me by Letters Patent, is—

1. A machine for screening, rolling, and otherwise preparing pottery-stock and relieving the same of air-bubbles or blisters, provided with a plunger, $v$, having an up-and-down movement within a receiving-cylinder, $f$, by which the clay or stock is pressed through a screen or perforated disk, $k''$, formed on or connected with the bottom of a curved tapering tube, $k$, up through and out of the said tube upon an endless feed-roll, $p''$, where the stock is cut in the exact size required for use by the operation of cutters adjusted to the desired width and raised above or lowered upon the said stock or clay, substantially as hereinabove specified.

2. In machines for preparing pottery-stock a curved tube, $k$, tapering within toward its mouth, and arranged to turn back and forth horizontally on the top of a receiving-cylinder, $f$, substantially as and for the purposes described.

3. The combination of the screw-stem $w$, wheel $x$, or their mechanical equivalents, and their supporting-frame, plunger $v$, receiving-cylinder $f$, adjustable tapering tube $k$, screen $k''$, feed-roll or chain $p''$, and adjustable cutters or wires $u$, all arranged and operating substantially as and for the purposes herein set forth.

In testimony whereof I have signed my name to this specification in the presence of two subscribing witnesses.

SAMUEL R. THOMPSON.

Witnesses:
CARROLL D. WRIGHT,
SAML. M. BARTON.